(12) United States Patent
Beering

(10) Patent No.: US 6,982,964 B2
(45) Date of Patent: Jan. 3, 2006

(54) HIGH PERFORMANCE ECL-TO-ATM PROTOCOL NETWORK GATEWAY

(76) Inventor: David R. Beering, 618 Maplewood Dr., Wheaton, IL (US) 60187-1400

( * ) Notice: Subject to any disclaimer, the term of this patent is extended or adjusted under 35 U.S.C. 154(b) by 870 days.

(21) Appl. No.: 09/977,419

(22) Filed: Oct. 15, 2001

(65) Prior Publication Data

US 2003/0072275 A1   Apr. 17, 2003

(51) Int. Cl.
  *H04B 7/185*  (2006.01)
(52) U.S. Cl. .................. 370/316; 370/252; 370/395.1; 370/395.61; 370/395.62; 370/395.51; 375/233; 375/346
(58) Field of Classification Search .............. 370/316, 370/252, 395.1, 395.61, 395.6, 395.62, 395.51, 370/395.52, 468; 375/233, 346
  See application file for complete search history.

(56) References Cited

U.S. PATENT DOCUMENTS

| 5,471,657 | A | 11/1995 | Gharpuray ................. 455/12.1 |
| 5,572,530 | A | 11/1996 | Chitre et al. ............. 370/110.1 |
| 5,600,653 | A | 2/1997 | Chitre et al. ................ 370/474 |
| 5,915,217 | A | 6/1999 | Wiedeman et al. ......... 455/427 |
| 5,933,607 | A * | 8/1999 | Tate et al. ............. 370/395.61 |
| 6,014,374 | A | 1/2000 | Paneth et al. ............... 370/345 |
| 6,047,002 | A | 4/2000 | Hartmann et al. .......... 370/466 |
| 6,104,925 | A | 8/2000 | Grube et al. ................ 455/428 |
| 6,118,779 | A | 9/2000 | Madonna .................... 370/353 |
| 6,157,624 | A | 12/2000 | Zancho ....................... 370/316 |
| 6,167,062 | A | 12/2000 | Hershey et al. ............ 370/503 |
| 6,215,776 | B1 | 4/2001 | Chao .......................... 370/316 |
| 6,259,891 | B1 | 7/2001 | Allen ........................ 455/3.02 |
| 6,643,788 | B1 * | 11/2003 | Butler et al. ................ 713/400 |

* cited by examiner

*Primary Examiner*—Wellington Chin
*Assistant Examiner*—Raj Jain
(74) *Attorney, Agent, or Firm*—Emrich & Dithmar LLC

(57) ABSTRACT

A network protocol translation device that allows serial data sent using the standard Asynchronous Transfer Mode (ATM) protocol to be used between two locations, using a satellite link or a terrestrial wireless link between the two locations. This is done by translating the standard ATM data to a standard satellite modem interface at one location, and translating the data back to the ATM format at the second (remote) location. The translation can occur at any data rate up to the available effective bandwidth of the ATM connection. The device is also capable of providing Forward Error Correction in the protocol translation. The device is functionally transparent to protocols above ATM, i.e., IP, UDP and TCP. It also interfaces with standard physical layers below ATM such as Synchronous Optical Network (SONET). At the satellite interface, the device is compatible with (but not limited to) Emitter Coupled Logic (ECL).

10 Claims, 10 Drawing Sheets

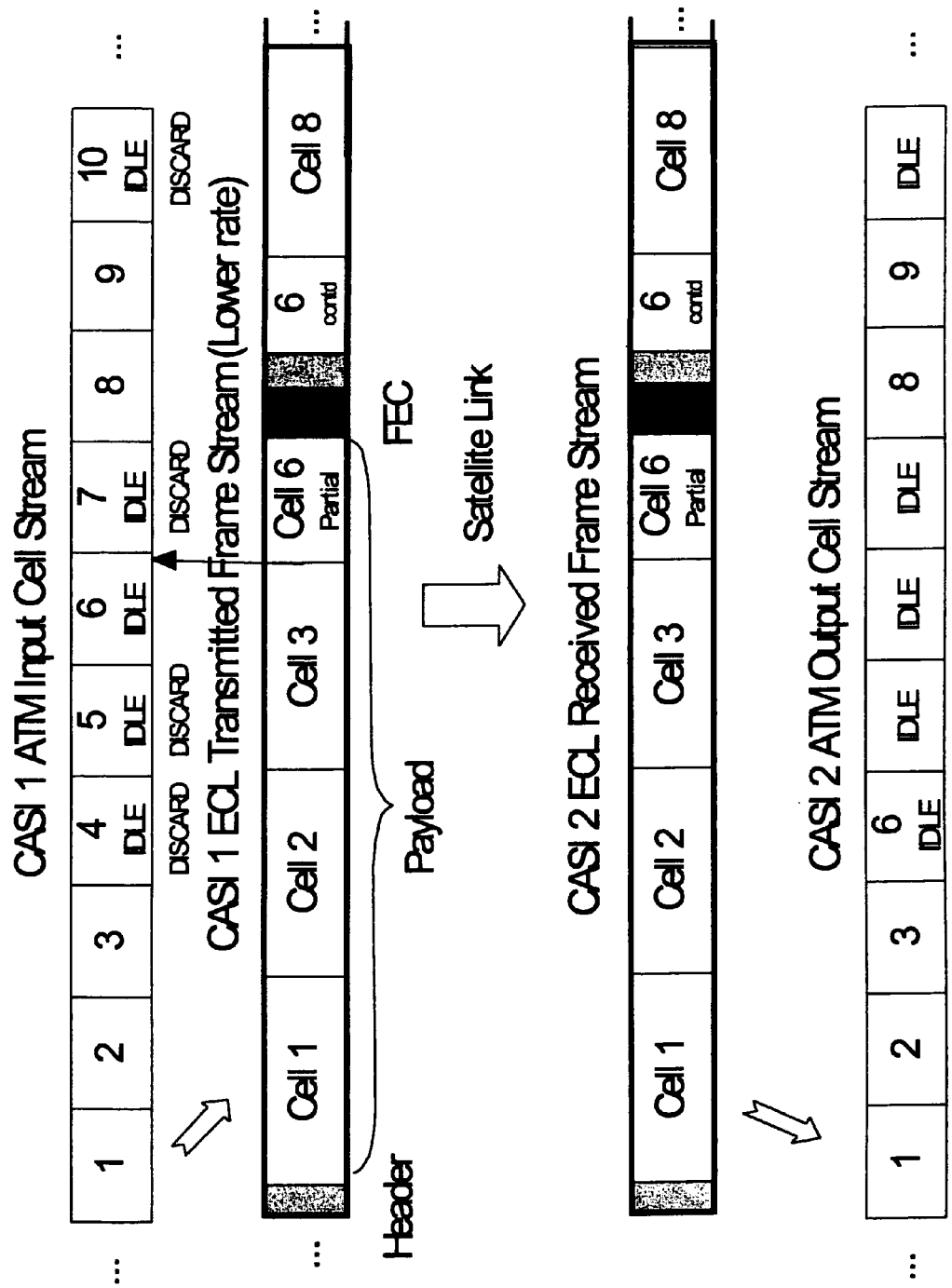
FIG. 10 Figure xxx - CASI Data Timing

HIGH PERFORMANCE ECL-TO-ATM PROTOCOL NETWORK GATEWAY

CONTRACTUAL ORIGIN OF THE INVENTION

This invention was made with Government support under Prime Contract #NAS-9-98100 awarded by the National Aeronautics and Space Administration. The United States Government has certain rights in the invention.

FIELD OF THE INVENTION

This invention relates generally to electronic networking equipment, and is particularly directed to an enhanced method and apparatus for the translation of different data protocols in a high throughput communication link employing both wired and wireless network platforms. More specifically, this invention is directed to the connection of a high speed, variable data rate satellite network to a conventional ground-based, fixed data rate commercial communications network in a manner which increases systems throughput without impacting satellite or ground-based network design and operation.

BACKGROUND OF THE INVENTION

With the advent of personal computers, the need for interconnectivity between computational platforms has grown exponentially. In the business environment, connectivity is necessary for transmittal of email and numerous other types of data including audio and video. In the residential area, many homes are now connected via the Internet. All of this interconnectivity requires increasingly higher throughput across both wired and wireless networks.

The transmission of high data rates, such as for video signals, requires expensive connections when performed over wired networks. For temporary applications, the installation cost becomes prohibitive. The most economical solution is to transmit data via satellites. This method eliminates the high cost of connecting any location with coaxial wire or fiber optics to the nearest telephone switching office.

Existing satellites are equipped with several transponders that relay information. Each transponder typically has a pass-band of 36 megahertz. Using present modulation and coding systems, these transponders can handle a data rate of nearly 70 megabits/second. Satellites operating in the Ka band are expected to be available to the marketplace in the next 2–3 years. These Ka band transponders will support pass-bands of 100 to 500 megahertz.

On the ground, existing networking equipment runs at established fixed speeds. These speeds include (in megabits/second): 1.5, 45, 155, and 622. To connect a satellite communications network with ground-based network, the satellite modem must operate at lower speeds that are identical to ground-based speeds. This severely limits the efficiency of the satellite's available bandwidth.

The satellite connection is handled through a satellite modem. Current satellite modems use a serial input/output such as RS-449. A translation device is required to connect the standards based ground network to the satellite modem. If the satellite is operating at a similar speed, it can be effectively connected using a commercial router. To operate efficiently at any other speed, the connection must be made through a different interface device.

The prior art includes three types of interface devices. All of these devices convert the satellite modem serial data to/from the standards based protocols of Asynchronous Transmission Mode (ATM) or Ethernet. These devices, two of which are commercial and one of which is a governmental (NASA) design, include:

1) The COMSAT Link Accelerator (CLA-2000) converts RS-449 serial interface at up to 8 megabits/second to an ATM interface at a fixed 45 megabits/second. The CLA-2000 was recently upgraded to support 10 megabits/second Ethernet in addition to ATM.

2) The Metrodata LA-1000 converts, an Asynchronous Serial Interface (ASI) to ATM. The LA-1000 interfaces between satellite modems with DVB-ASI interfaces and ATM networks at speeds up to about 100 megabits/second. The LA-1000 does not support satellite modems with Emitter Coupled Logic (ECL) interfaces.

3) The NASA Goddard Space Flight Center's Ground Router Interface Device (GRID) includes the features of the CLA-2000 and the capability to support multiple RS-449 interfaces. This device is also limited to 8 megabits/second on the terrestrial serial interface. Details of GRID are proprietary and not publicly available. Current systems in the ECL domain are thus limited to 8 megabits/second.

Referring to FIG. 1, there is shown a simplified block diagram of a current satellite communication system 10 for communicating with the International Space Station (ISS) 12. The ISS 12 communicates with a ground station 16, which in the present case is NASA's White Sands Complex (WSC), via a Tracking & Data Relay Satellite (TDRS) 14. The uplink from the ground station 16 to TDRS 14 is at a data rate of 3 megabits per second (Mb/s), while the downlink to the ground station is at the rate of 50 Mb/s. The Ku-SA channel forward link from TDRS 14 to ISS 12 is 50 MHz wide, while the Ku-SA channel return link from ISS to TDRS is 225 MHz wide. The TDRS ground system 16 does not afford a Forward Error Correction (FEC) capability, which limits the capability of this link. The downlink signal received from TDRS 14 undergoes frequency translation in the ground station 16 and is provided to a TDRS modem 18 which demodulates the 50 Mb/s signal down to a baseband signal which includes an ECL clock signal and the received data. The ECL clock signal and the data are provided to a high rate switch 20, which is adapted for interfacing with the combination of a domestic satellite (DOMSAT) 26 and DOMSAT modem 24 within the ground station 16. An "Air Gap" is illustrated in the ground station 16 between the high rate switch 20 and a SONET mux 22 to illustrate that there is currently no available means for linking a 50 Mb/s signal to a conventional ground communication network such as SONET. The ECL clock signal and data are provided from the high rate switch 20 to the domestic satellite 26 via the DOMSAT modem 24. Domestic satellite 26 is a commercial spacecraft operating in the Ku band, which receives signals and retransmits the signals at a data rate of 50 Mb/s. The domestic satellite 26 retransmits the data in a downlink to an earth facility such as NASA's Marshall Space Flight Center (MSFC) 28 and NASA's Johnson Space Center (JSC) 30 in the form of synchronous serial data. This satellite communications network is government proprietary and thus not available to the general public, is expensive to operate, and suffers from an extensive signal delay in the link between ground station 16 and the NASA space centers 28 and 30 via the domestic satellite 26, e.g., an average delay of 270 ms.

Another disadvantage of this and other prior approaches is that satellites are forced to operate at data rates dependent on the terrestrial network components at either end of the link. Often, the ideal data rates of the wireless satellite network segment lie in between the supported terrestrial data rates. To guarantee error-free connections via satellite, sufficient signal power must be provided to account for atmospheric disturbances such as clouds and rain. Reducing the data rates effectively eliminates the need to increase RF power levels to compensate. However, prior approaches do not allow for agile data rates.

Another disadvantage of prior approaches involves Forward Error Correction (FEC), which is a well-known tool for increasing communications link reliability. The high rate satellite modems 18 for Tracking & Data Relay Satellites (TDRS) do not employ Reed-Solomon FEC. To maximize the capability of these high rate connections, Reed-Solomon FED must be employed on the ISS 12 and at the high rate modem 18.

The present invention addresses the aforementioned limitations of the prior art by providing continuously adjustable input/output serial data rates via ECL-based satellite modems and converting the data rate to standards-based terrestrial network data rates with Reed-Solomon FEC capability at speeds up to 622 megabits/second.

OBJECTS AND SUMMARY OF THE INVENTION

Accordingly, it is an object of the present invention to link an Emitter Coupled Logic satellite communications network to a conventional ground-based Asynchronous Transfer Mode Network with minimum impact on the operations and configuration of the network.

It is another object of the present invention to connect a high speed, variable data rate communications network to a fixed data rate communications network in a synchronous manner.

Yet another object of the present invention is to provide a data rate independent, synchronous RF network connecting a standards-based satellite network and a standards-based ground communications network, which allows for interactive communications between the two networks.

A further object of the present invention is to provide adaptive error correction coding in a satellite and ground-based communications network operating at the high data rates available in conventional ground-based communications networks.

A still further object of the present invention is to provide a communications interface between synchronous serial data circuits and a fiber optic or wide area network.

Another object of the present invention is to provide an agile satellite serial data rate that allows a satellite transponder/modem to operate at its most efficient data rate.

A still further object of the present invention is to provide a satellite modem interface to any protocol above ATM such as Internet Protocol (IP), User Datagram Protocol (UDP), and Transmission Control Protocol (TCP).

The present invention contemplates conversion of Emitter Coupled Logic (ECL)-based synchronous serial data having a variable data rate such as used in satellite-based space communications to a high speed, fixed data rate such as employed in ground-based communications networks such as of the ATM type with minimal impact on the operation and configuration of the communications network. The inventive approach employs a network protocol translation device, which permits synchronous serial data from the satellite network to be converted to the protocol of any one of various ground-based conventional communications networks such as of the ATM type at virtually any serial data rate up to the available effective bandwidth of the ATM connection. Adaptive forward error correction is provided in the protocol translation, with operation possible at data rates intermediate the fixed, stratified rates of conventional ground communications networks. The ECL-ATM protocol interface device includes both ECL-ATM and ATM-ECL processors for bi-directional communications and includes ATM interfaces for SONET and other terrestrial connections such as Ethernet.

BRIEF DESCRIPTION OF THE DRAWINGS

The appended claims set forth those novel features, which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 10 is a simplified timing diagram showing how differing timing rates of the ATM and ECL data streams are reconciled by showing the cell or frame composition of data streams in various portions of an ECL-ATM protocol interface arrangement in accordance with the present invention.

DETAILED DESCRIPTION OF THE PREFERRED EMBODIMENTS

Figure 1:
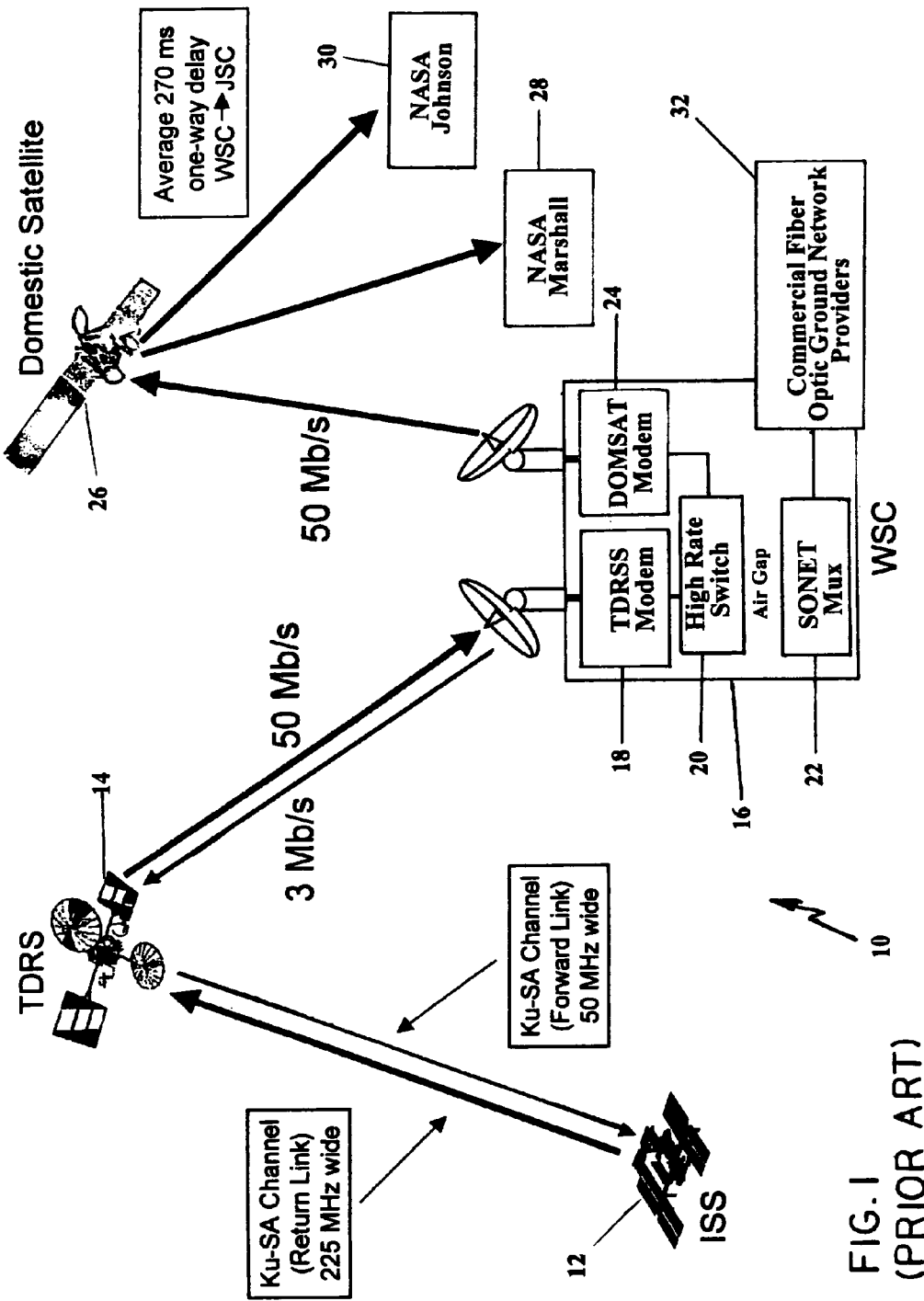
FIG. 1 is a simplified block diagram of a current satellite communications system for the International Space Station (ISS)
Figure 2:
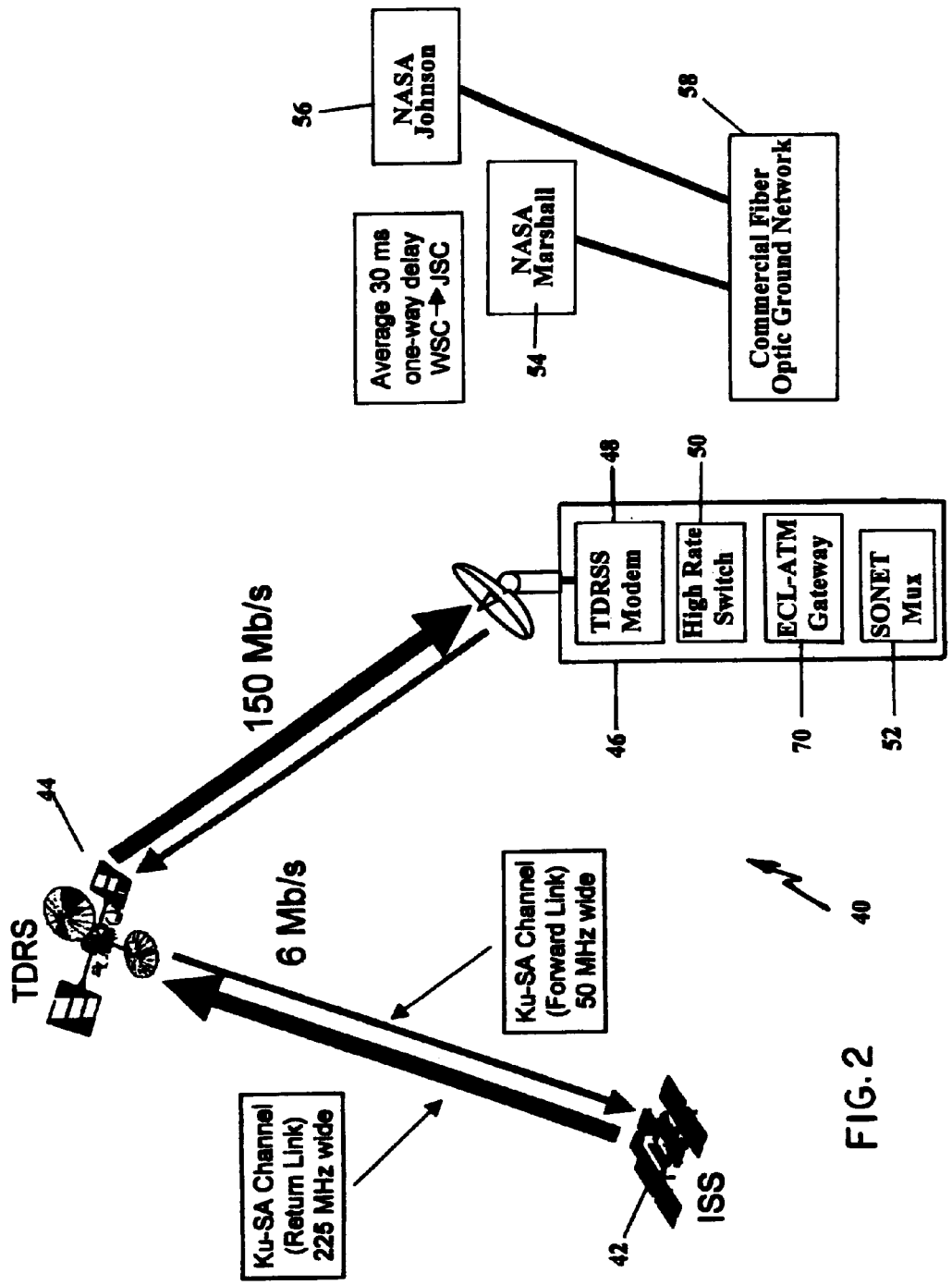
FIG. 2 is a simplified block diagram of a communications system in accordance with the present invention for use with the ISS.

Referring to FIG. 2, there is shown a simplified block diagram of a satellite communications system 40 in accordance with the present invention. The satellite communications system 40 provides a networkprotocol translation for allowing a variable data rate satellite communications network to interface directly with a conventional ground-based, fixed rate commercial communications network such as of the ATM type. The specific example in terms of which the present invention is disclosed provides a link between the International Space Station (ISS) 42 via a Tracking & Data Relay Satellite (TDRS) 44 to a ground station 46. In a specific example of the invention, the White Sands Complex (WSC) is contemplated as the ground station 46, which interfaces by means of the present invention with the Marshall Space Flight Center (MSFC) 54 and Johnson Space Center (JSC) 56. As in the previously described prior art system, ground station 46 communicates with TDRS 44 by means of a TDRS modem 48, which is coupled to a high rate switch 50. The MSFC 54 and JSC 56 are connected by means of a commercial fiber optic ground network 58 to a SONET mux 52 within the ground station 46. In accordance with the present invention, an ECL-ATM protocol interface device 70 connects the high rate switch 50 and the SONET mux 52 in ground station 46. The term "gateway" as used herein means a translation or protocol interface device for permitting two communications networks having different protocols to communicate without restriction. The ECL-ATM protocol interface device 70 of the present invention allows a high speed standard communications network to operate at its most efficient data rate with a commercial ground-based communications network using industry standard interface criteria. A comparison of FIGS. 1 and 2 shows that the satellite communication system 40 of the present invention eliminates the domestic satellite link of prior art satellite-ground communications networks to provide a more cost effective approach which allows for conversion of Emitter Coupled Logic (ECL)-based serial data from a satellite modem to a conventional ground-based communications network data protocol such as Asynchronous Transfer Mode (ATM).

Figure 3:
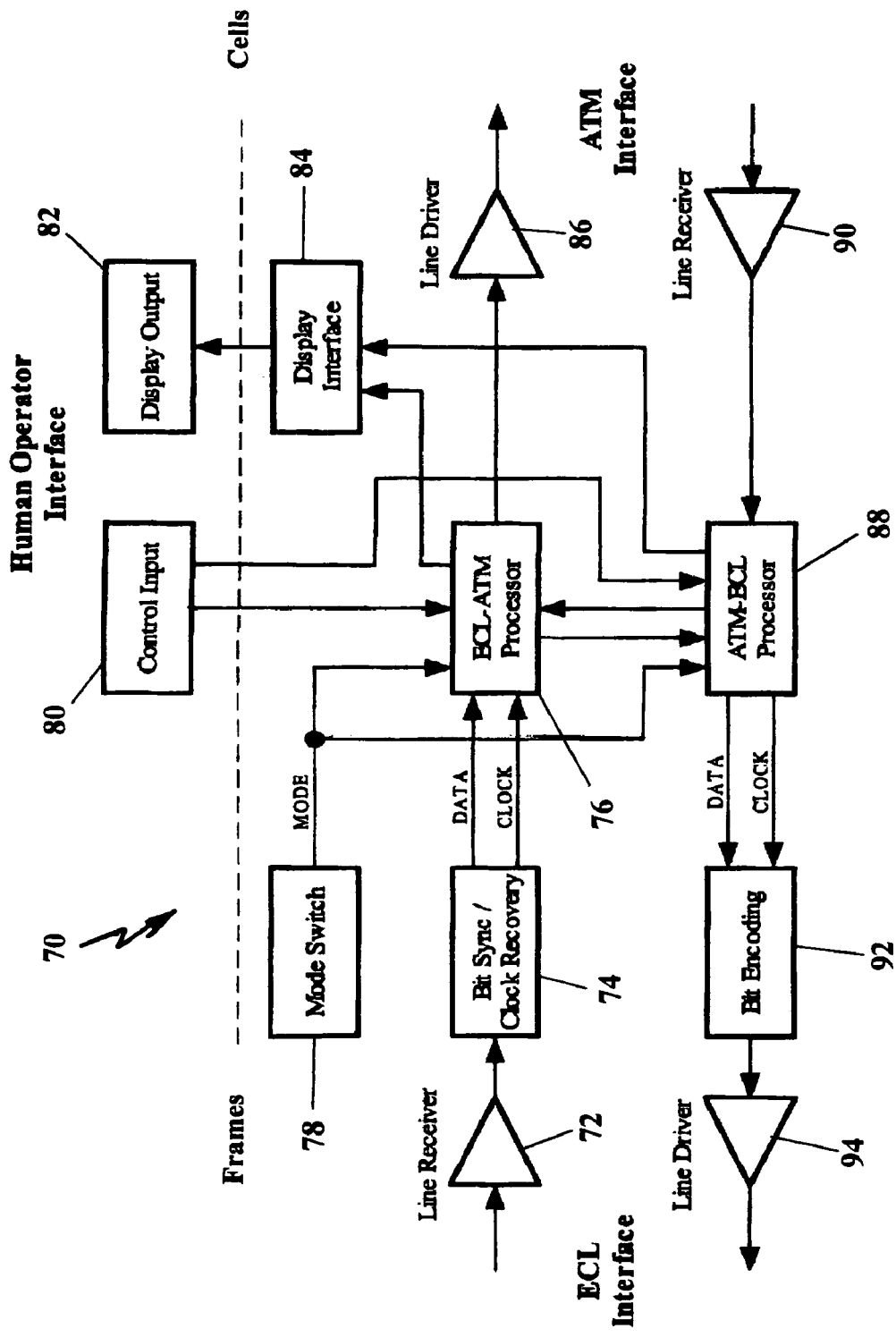
FIG. 3 is a simplified block diagram of an ECL-ATM protocol interface device in accordance with the principles of the present invention.

Referring to FIG. 3, there is shown a simplified block diagram of an ECL-ATM protocol interface device 70 for use in the present invention. The protocol interface device 70 includes a line receiver 72 at the ECL interface for receiving signals transmitted from a satellite or satellite-compatible modem utilizing ECL format such as a TDRS modem 48 as shown in FIG. 2. The output of the line receiver 72 is provided to a bit sync/clock recovery circuit 74, which separates the data and clock signal in the received signal. The bit sync/clock recovery circuit 74 includes a jitter buffer for smoothing out any changes in the data rate which is accomplished by an ECL-ATM processor 76. The data and clock signals are provided to the ECL-ATM processor 76, which is shown in block diagram form in FIG. 4 and is described in detail below. Other inputs to the ECL-ATM processor 76 are a "mode" signal from a user operated mode switch 78 and a "control" signal from a control input 80. Control input 80 and a display output 82 from a human operator interface allow an operator to exercise control over ECL-ATM protocol interface device 70. Control input 80 is preferably in the form of a computer keyboard or plural switches, while display output is preferably in the form of a cathode ray tube or LED readout. A display interface 84 provides an appropriate input to the display output 82 from the ECL-ATM processor 76 and an ATM-ECL processor 88 for the display of information for use by the operator. The ECL-ATM processor 76 converts the serial data stream received from the bit sync/clock recovery circuit 74 from a frame format to a cell format, as described in detail below, which cell formatted signal is provided to a line driver 86 for providing an ATM or SONET interface. The ECL-ATM processor 76 also links together the variable data rate satellite clock and the terrestrial network clock having a fixed data rate so that no valid data is lost.

ECL-ATM protocol interface device 70 further includes an ATM-ECL processor 88, which is shown in block diagram form in FIG. 5 and is described in detail below. The ATM-ECL processor 88 is coupled to the ECL-ATM processor 77 for the exchange of data and control signals. The ATM-ECL processor 88 receives input data from a line receiver 90, which serves as an ATM interface with the ATM network. The output of the ATM-ECL processor 88 is an ECL-based signal having a data component and a clock component, which are provided to a bit encoding circuit 92 where they are combined. The output of the bit encoding circuit 92 is provided to a line driver 94 at the ECL interface for providing a frame-compatible signal to the satellite communications network.

Figure 4:
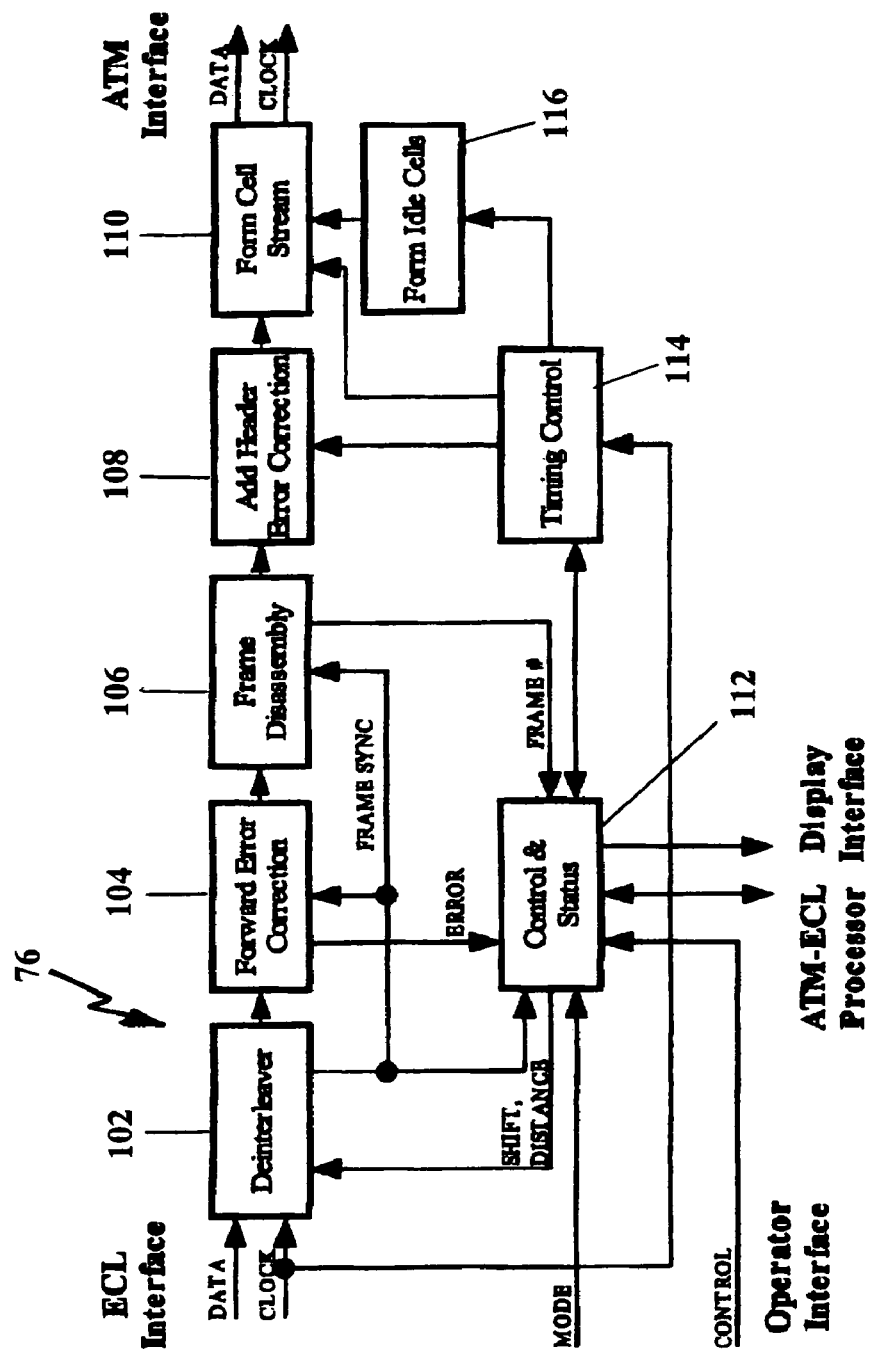
FIG. 4 is a simplified block diagram of an ECL-ATM processor used in the protocol interface device of FIG. 3.

Referring to FIG. 4, there is shown a simplified block diagram of the ECL-ATM processor 76 used in the ECL-ATM protocol interface device 70 of FIG. 3. The ECL-ATM processor 76 receives data and clock signals from the ECL interface, which are provided to a deinterleaver 102 in the ECL-ATM processor. Deinterleaver 102 unscrambles the received ECL-based signal and provides the unscrambled signal to a Forward Error Correction (FEC) circuit 104, which detects bit errors in the received signal arising from noise and corrects these errors. The control and status circuit 112 indicates to the deinterleaver 102 the "distance" of interleaving used by the transmitter of this data, so that the same value is used by both transmitter and receiver. The control and status circuit 112 also initially forces the deinterleaver 102 to shift incoming data until the correct synchronization of data on frame boundaries occurs. Deinterleaver 102 provides this frame sync indication to the forward error correction circuit 104 as well as to a frame disassembly circuit 106. Frame disassembly circuit 106 receives the output from the FEC circuit 104 for removing idle cells from the frames in the received ECL-based signal. The idle cells removed from the signals by the frame disassembly circuit 106 are provided to an add header error correction circuit 108 which computes the error correction code so the data receiver can correct for errors in the header portion of the cell signals. The cell signals are then provided to a form cell stream circuit 110 which forms the cell into a bit stream which is output in the form of data and a clock signal to an ATM interface. The control and status circuit 112 receives various control and status inputs and provides various control and status outputs. For example, a mode control input is provided from the ECL interface to the control and status circuit 112. A control input is provided from the control input 80 in the operator interface to the control and status circuit 112 as previously described. An error signal indicating the number of errors in the received data is provided by the forward error correction circuit 104 to the control and status circuit 112. Other control inputs are provided to the control and status circuit 112 from the ATM-ECL processor and the control and status circuit provides various outputs to the display interface as previously described. The status output provided by the control and status circuit 112 to the display interface allows an operator to be informed of the numbers of bit errors in the data as well as to determine if the system is operating correctly with a statistical summary of system operation provided visually such as on a video display. The mode and control inputs to the control and status circuit 112 are initiated by an operator to allow the operator to override automatic control signals. Timing signals are provided between the control and status circuit 112 and a timing control circuit 114 and a frame number input is provided from the frame disassembly circuit 106 to the control and status circuit 112. A frame sync signal output by the deinterleaver circuit 102 is also provided to the control and status circuit 112 which, in turn, provides "shift" and "distance" signals to the deinterleaver circuit 102. Timing control circuit 114 also provides timing control signals to the add header error correction circuit 108, the form cell stream circuit 110, and a form idle cells circuit 116 for syncing the cells. The number of idle cells inserted in the data stream by the form idle cells circuit 116 is determined by the timing difference between the timing control input from the ECL clock and the input from the control and status circuit 112 for providing an output to the form cells stream circuit 110 which outputs data and a clock signal to the ATM interface.

This insertion of idle cells makes up any difference in data rate between the ECL data stream and the ATM data stream while maintaining the constant data rate and standardized format of the ATM interface.

Figure 5:
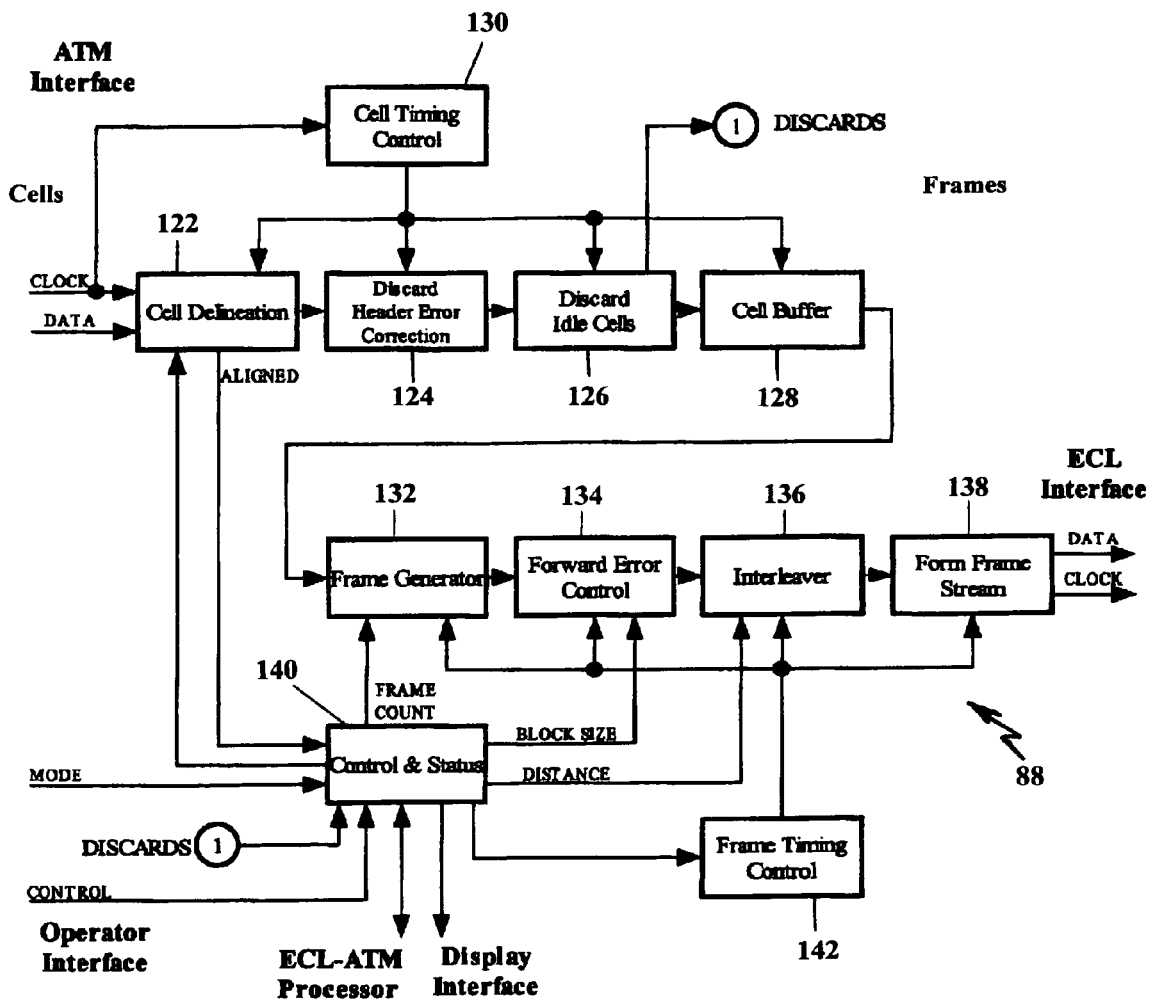
FIG. 5 is a simplified block diagram of an ATM-ECL processor used in the protocol interface device of FIG. 3.

Referring to FIG. 5, there is shown a simplified block diagram of the ATM-ECL processor 88 used in the ECL-ATM protocol interface device 70 of FIG. 3. The left hand portion of FIG. 5 represents the ATM interface for interfacing with the ground-based communications network, while the right hand portion of the figure represents the ECL interface for interfacing with the satellite communications network. The ATM-ECL processor 88 includes a cell delineation circuit 122, which receives data and a clock signal from the ATM interface. The cell delineation circuit 122 synchronizes the cells received from the ATM interface and provides an "aligned" signal to a control and status circuit 140 once cell synchronization is achieved. The cell delineation circuit 122 determines where one cell ends and the next cell starts. A clock signal is provided to the cell delineation circuit 122 as well as to a cell timing control circuit 130 which provides timing signal inputs to the cell delineation circuit 122, a discard header error correction circuit 124, a discard idle cells circuit 126, and a cell buffer circuit 128. This portion of the ATM-ECL processor 88 processes the incoming cells from the ATM communications network. The discard header error correction circuit 124 removes the header error correction from the received cell, while the discard idle cell circuit 126 removes idle cells from the received data and provides the data to the cell buffer circuit 128 for storage therein until there are enough cells to form a frame. The discarded idle cells are provided by the discard idle cell circuit 126 to a control and status circuit 140 for determining how many idle cells are included in the frame in synchronizing the timing of the received cells and the outgoing frames. The received cells are temporarily stored in the cell buffer circuit 128 for compensating for cells being received at various data rates. The output of the cell buffer circuit 128 is provided to the serial combination of a frame generator circuit 132, a forward error control circuit 134, an interleaver circuit 136, and a form frame stream circuit 138, all of which are used in the generation of frames comprised of the received cells. The control and status circuit 140 is connected to each of these latter circuits and provides control signals to each of these circuits for controlling the data and clock signal output to the ECL interface by the form frame stream circuit 138.

Various inputs are provided to the control and status circuit 140 for controlling its operation. For example, a "mode" signal is provided from the operator control mode switch 78 within the ECL-ATM protocol interface device 70 as shown in FIG. 3. Control signals are also provided to the control and status circuit 140 from the operator interface. Other inputs to the control and status circuit 140 of the ATM-ECL processor 88 are received from the ECL-ATM processor 70 shown in FIG. 4. The control and status circuit 140 provides a "frame count" input to the frame generator circuit 132 for keeping track of the number of frames generated and for generation of each frame following receipt and detection of the required number of cells. The control and status circuit 140 also provides a "block size" input to the forward error control circuit 134 and provides a "distance" input to the interleaver circuit 136. The interleaver circuit 136 scrambles the order of data bytes within the frame units for purposes of distributing the effects of a large noise burst into smaller perturbations among multiple frames. The forward error control circuit 134 provides the encoding portion of Reed-Solomon Forward Error Correction (FEC). A frame timing control circuit 142 receives timing inputs from the control and status circuit 140 and provides timing signals to each of the frame generator circuit 132, forward error control circuit 134, interleaver circuit 136, and form frame stream circuit 138. The form frame stream circuit 138 takes the information in the frames and outputs a clock signal as well as a serial data stream in the form of 1's and 0's to the bit encoding circuit 192 as shown in FIG. 3 for providing frame information to the ECL interface.

Figure 6:
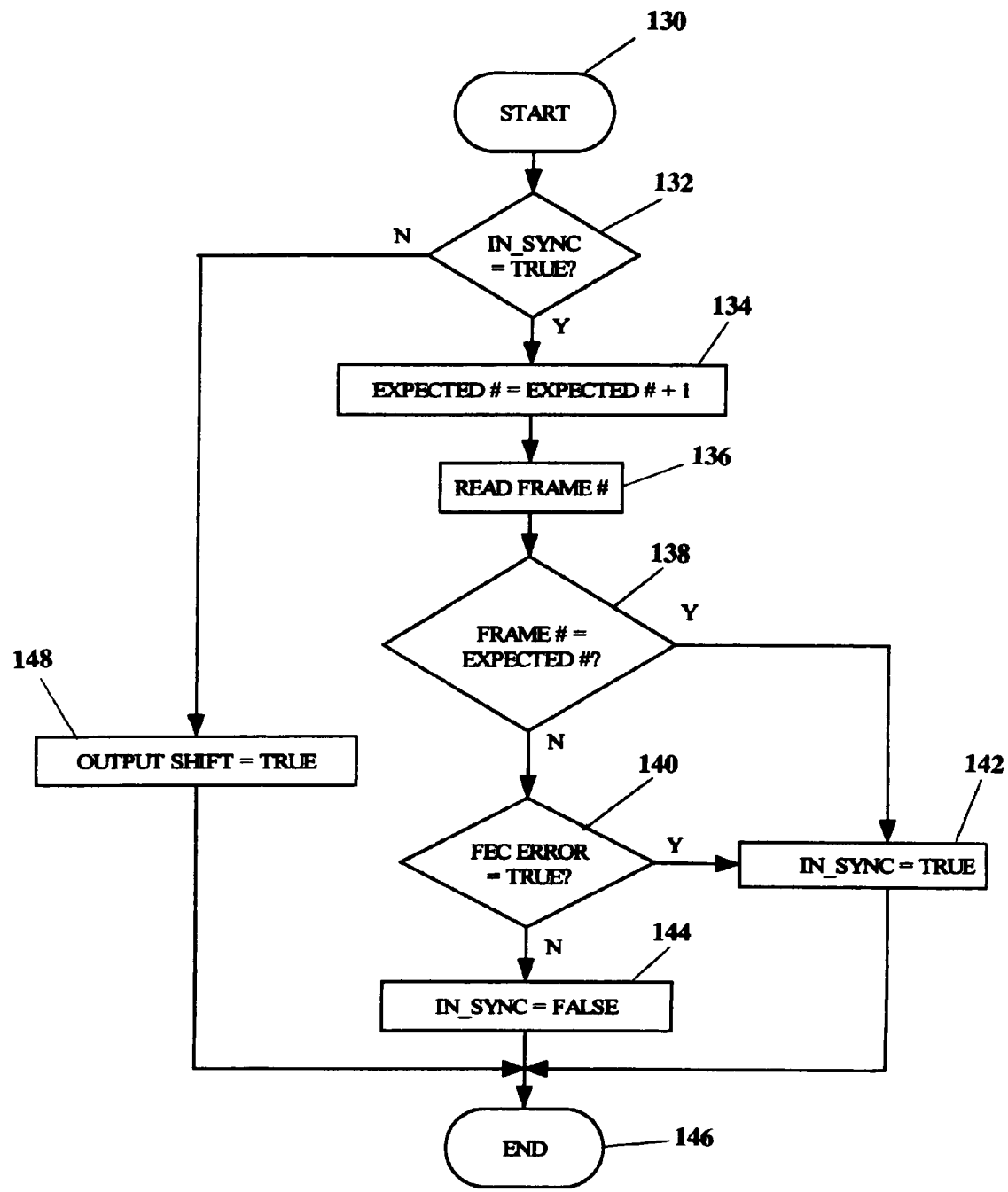
FIG. 6 is a flow chart illustrating the series of steps carried out in data frame acquisition by the ECL-ATM processor of FIG. 4.

Referring to FIG. 6, there is shown a simplified flow chart of the series of steps carried out in data frame acquisition by the ECL-ATM processor 76 of FIG. 4. The ECL-ATM processor initiates frame acquisition at step 130 followed by monitoring of each group of received bits to determine if an IN_SYNC flag representing successful synchronization of a frame is present at step 132. The detection of an IN_SYNC signal at step 132 indicates that the system has detected the beginning of a frame in the normal operating mode, and the program then proceeds to step 134 for incrementing the expected frame number by 1. The program then reads the incremented frame number at step 136 and determines at step 138 if the detected frame number is the same as the expected frame number. If the detected frame number matches the expected frame number as determined at step 138, the program proceeds to step 142 and verifies that the IN_SYNC signal is true, confirming the acquisition of a frame and proceeds to step 146 for exiting the program. If at step 138 it is determined that the detected frame number does not match the expected frame number, the program proceeds to step 140 and determines if there is a Forward Error Correction (FEC) error present. If it is determined that a FEC error is present, the program proceeds to step 142 for confirming the IN_SYNC signal indicating that a frame has been acquired. The program then proceeds to step 146 for exiting the frame acquisition program. If at step 140 it is determined that there is no FEC error, the program sets the IN_SYNC flag FALSE to indicate that frame acquisition has not occurred the next time this cycle is executed. The program then proceeds to step 146 for exiting the frame acquisition program. If at step 132, it is determined that the IN_SYNC signal is not present, the program proceeds to step 148 for determining if an output shift has occurred and then proceeds to step 146 for exiting the frame acquisition program.

Figure 7:
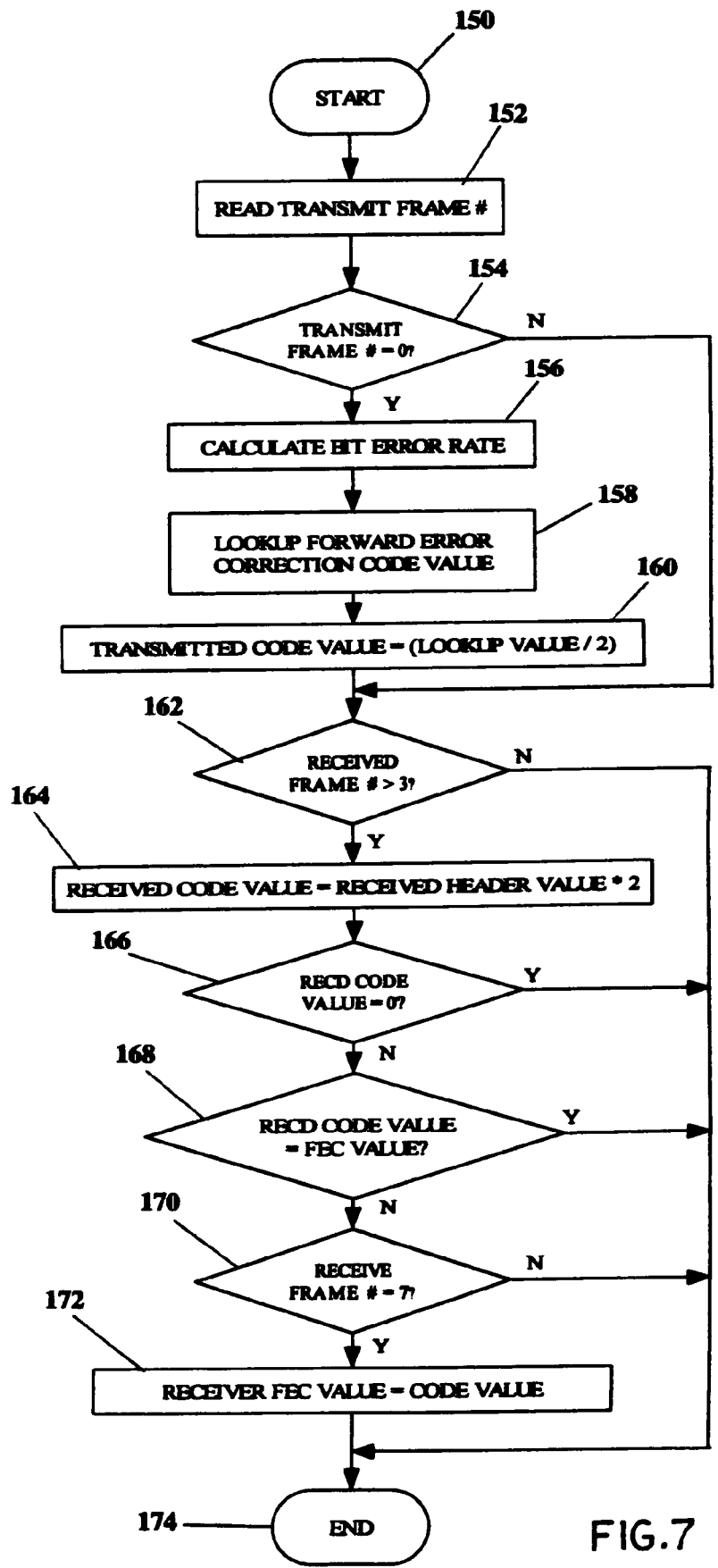
FIG. 7 is a simplified flow chart illustrating the series of steps to ensure correct synchronization of the adaptive forward error correction (FEC) code values carried out by the ECL-ATM processor shown in FIG. 4.

Referring to FIG. 7, there is shown a series of steps carried out by the ECL-ATM processor 76 of FIG. 4 for synchronizing the adaptive FEC code values received from the satellite. In this program, information provided by the receiver tells the transmitter that the number of errors in the received data has changed and that the transmitter must change its correction code value. The adaptive coding program in ECL-ATM processor 76 is initiated at step 150 followed by a reading of the transmit frame number at step 152. The transmitted frame number is received in the ECL format from a satellite. The program then at step 154 determines if the transmit frame number is 0. Frame number 0 is used to communicate between the transmitter and receiver. If at step 154 it is determined that the transmit frame number is not 0, the program proceeds to step 162 to determine if the received frame number is greater than 3. If at step 154, it is determined that the transmit frame number is 0, the program proceeds to step 156 and calculates the bit error rate which is calculated once every 256 bits, or counts. The adaptive coding routine shown in FIG. 7 increases the number of bits used for error correction as the bit error rate increases. The bit error rate is calculated on an ongoing basis from the number of corrected errors per frame. After calculating the bit error rate, the program proceeds to step 158 to determine the current Forward Error Correction (FEC) code value from a lookup table. The FEC code value changes with the bit error rate detected by the system, increasing in value with an increase in the detected bit error rate to provide the desired level of forward error correction. The FEC code value obtained from the lookup table is then divided by 2 at step 160 and is stored as the new FEC code value in memory. The program then at step 162 determines whether the received frame number is greater than 3, which is the frame in which an updated code value is sent to the transmitter. If it is determined at step 162 that the received frame number is not greater than 3 the program proceeds to step 174 and ends while continuing to use the FEC code value originally stored in the lookup table as determined at step 158.

If at step 162, it is determined that the received frame number is greater than 3, the program updates the transmitter value by proceeding to step 164 and setting the FEC code value equal to the received header value times 2. The program then at step 166 determines whether the received code value is 0. If the received code value is 0, the program branches to step 174 and exits the program. If at step 166, it is determined that the received FEC code value is not equal to 0, the program proceeds to step 168 and determines if the received code value is equal to the FEC value. If these two values are the same, the program proceeds to step 174 for exiting the program. If at step 168, it is determined that the received FEC code value is not equal to the FEC value, the program proceeds to step 170 to determine if the received frame number is 7. If the received frame number is not 7, the program proceeds to 174 and exits the program. If at step 170 it is determined that the received frame number is 7, the program proceeds to step 172 and sets the receiver FEC value to the new correction code value. The program then proceeds to step 174 and exits the program.

Figure 8:
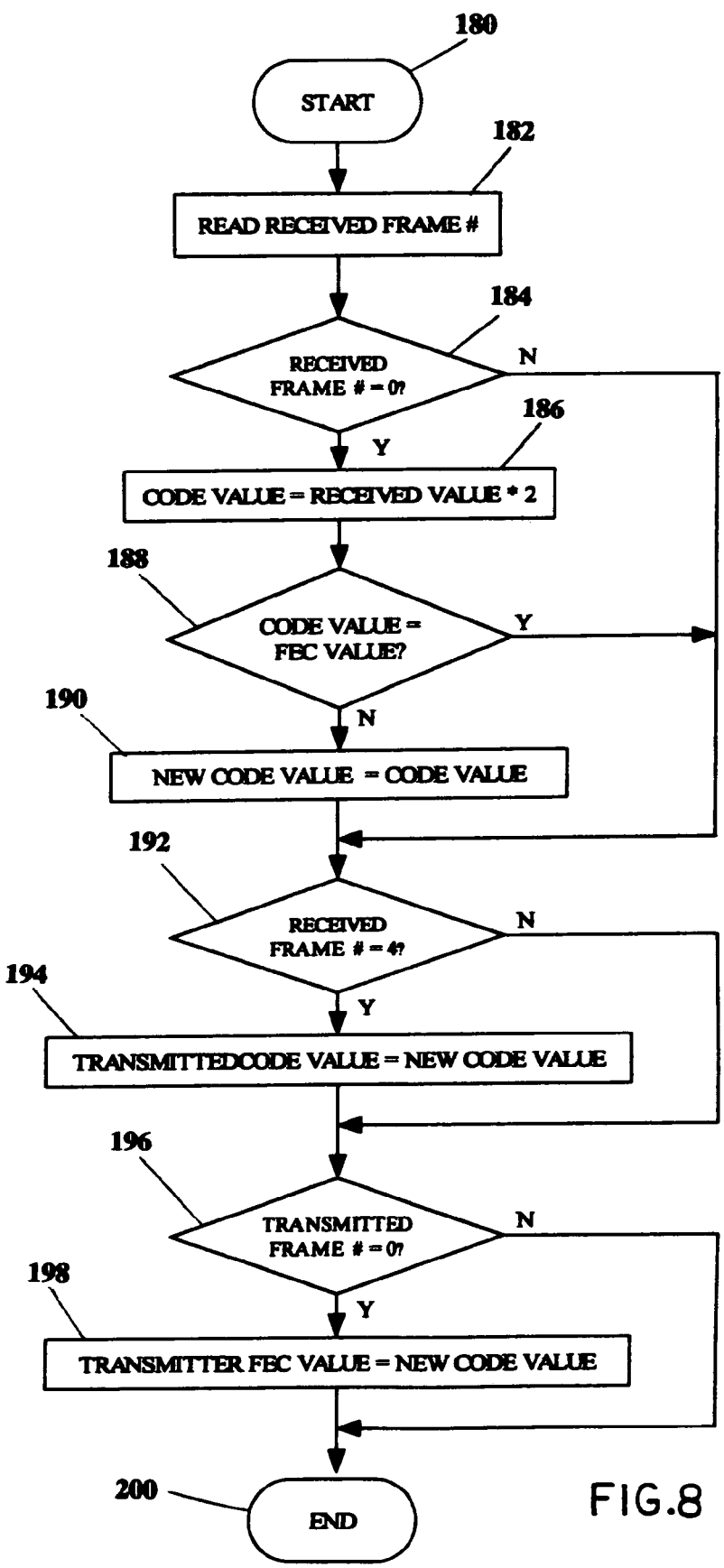
FIG. 8 is a simplified flow chart illustrating the series of steps carried out to ensure correct synchronization of the adaptive FEC coding process by the ATM-ECL processor shown in FIG. 5.

Referring to FIG. 8, there is shown a simplified flow chart illustrating the series of steps carried out in the same adaptive FEC coding synchronization process shown in FIG. 7 but carried out by the ATM-ECL processor 88 of FIG. 5 in proceeding from the ATM protocol to the ECL protocol. The adaptive FEC coding program stored in the ATM-ECL processor 88 is initiated at step 180 followed by a reading of the received frame number from the ATM interface at step 182. The program then at step 184 determines if the received frame number is 0, and if so, proceeds to step 186 and sets the correction code value equal to the received correction code value times 2. The program at step 188 then compares the just reset code value to the FEC value currently being used. If the new code value is equal to the current FEC value, the program proceeds to step 192 and determines if the received frame is frame number 4. If at step 188 it is determined that the reset code value is not equal to the current FEC value, the program proceeds to step 190 and updates the code value with the new FEC code value and proceeds to step 192 for determining if the received frame is frame number 4. Thus, the program updates the FEC code value at frame 0 if the code value has changed.

If at step 184, the program determines that the received frame number is not 0, the program proceeds to step 192 to determine if the received frame number is 4. If it is determined at step 192 that the received frame number is 4, the program proceeds to step 194 and sets the transmitted code value to the new code value. The program then proceeds to step 196 to determine if the transmitted frame number is 0. If at step 192 it is determined that the received frame number is not 4, the program proceeds to step 196 to determine if the transmitted frame number is 0. If the transmitted frame number is 0, the program proceeds to step 198 and updates the transmitter FEC value with the new code value. The program then proceeds to step 200 and exits the transmit adaptive error correction coding program. If at step 196 it is determined that the transmitted frame number is not 0, the program proceeds to step 200 for exiting the transmit adaptive error correction coding program.

Figure 9:
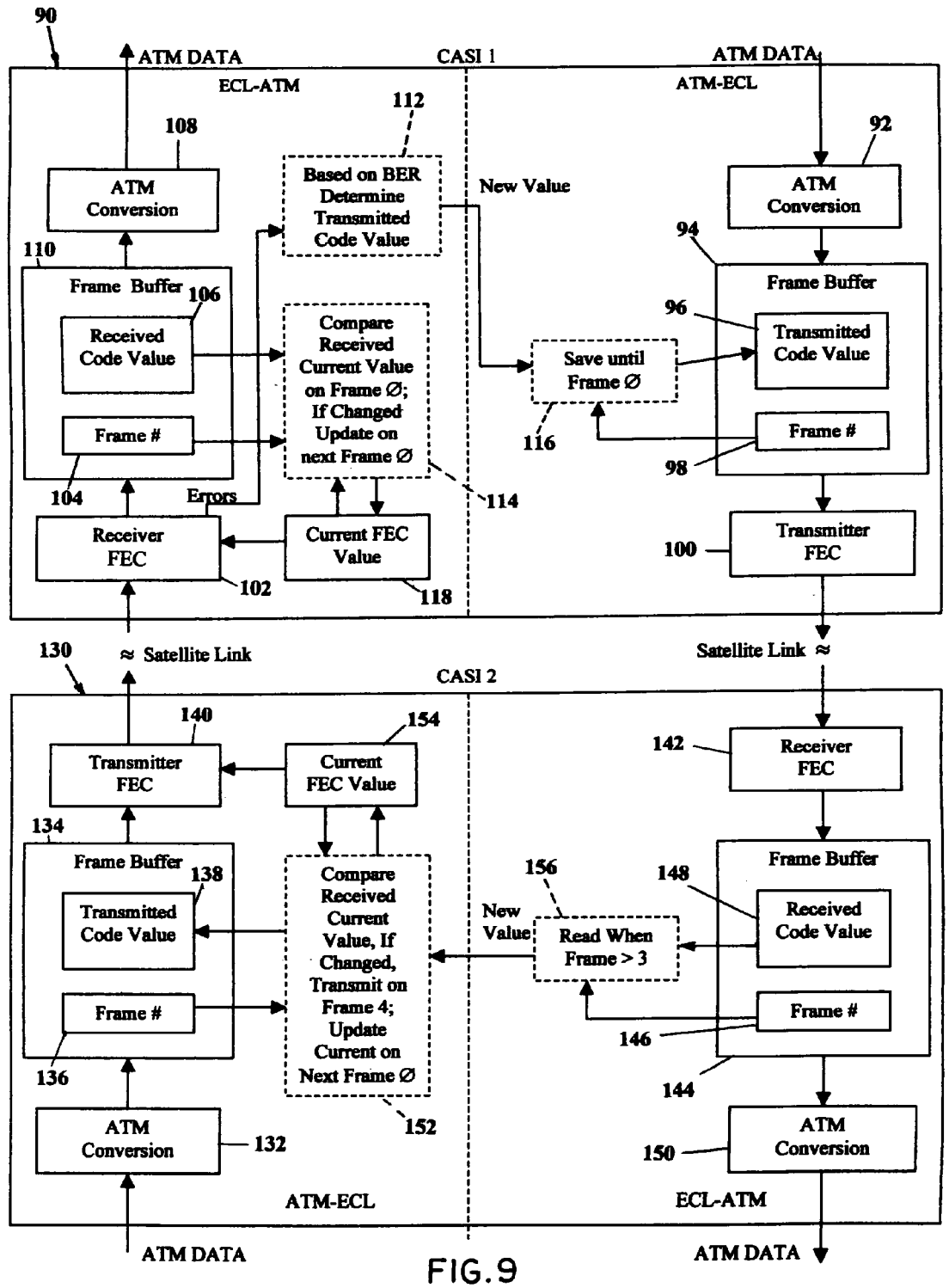
FIG. 9 is a simplified block diagram of a pair of ECL-ATM protocol interface devices illustrating the overall synchronization scheme shown in FIG. 7 and FIG. 8, the configuration of and signal flow in each device as well as the interfacing between a pair of devices within a communication network in accordance with the present invention.

Referring to FIG. 9, there is shown a simplified combined block diagram and flow chart illustrating the various components of and operations carried out by a pair of common ATM satellite interfaces (CASI) 90 and 130 communicating with one another via a satellite link in accordance with the present invention. The boxes in solid lines in FIG. 9 represent hardware components of the CASI's 90 and 130, while the blocks in dotted lines represent operations carried out by each of the CASI's. All the processing elements shown in the portions of this diagram labeled "ECL-ATM" are shown in FIG. 8 and all the processing elements shown labeled "ATM-ECL" are shown in FIG. 7. In the first CASI 90, ATM data is received from the ground-communications network by an ATM conversion circuit 92 which provides the data to a frame buffer 94 which provides the received frame number 98 to a save until frame equal 0 algorithm 116. This algorithm provides the transmitted FEC value to the frame buffer 94 which, in turn, provides the FEC value to a FEC transmitter 100 for providing the FEC value via a satellite link to a receiver FEC 142, which in turn, provides the received code value 148 to a frame buffer 144 in the second CASI 130. The received code value 148, as well the frame number 146, are read from the frame buffer 148 when the frame number is greater than 3 at step 156. An ATM conversion circuit 150 provides the data in ATM format from the second CASI 130 to an ATM ground communications network. The new FEC value is compared with the current FEC value at step 152. If the FEC value has changed, the new FEC value is transmitted in frame number 4 for updating the current FEC value on the next frame number 0 at step 152. This comparison is made by providing the current FEC value 154 for the aforementioned comparison at step 152. Also in the ATM-ECL portion of the second CASI 130, the ATM data is converted by an ATM conversion circuit 132 and is provided to a frame buffer 134, which provides the received frame number 136 at step 152 for comparing the current FEC value with the received FEC value at step 152. The transmitted code value 138 is provided by the frame buffer 134 to an FEC transmitter 142, which provides the data via a satellite link to the first CASI 90.

The first CASI 90 includes an FEC receiver 102. The FEC receiver 102 provides this data to a frame buffer 110 in the first CASI 90, which provides the frame number 104 as well as the received code value 106 at step 114 for comparing the received code value with the current code value in frame number 0. If at step 114 it is determined that the code value has changed, the current FEC value 118 is provided to the FEC receiver 102, which provides the updated FEC value to frame buffer 110. The FEC receiver 102 also provides an indication of the errors in the received data at step 112 for determination of the transmitted code value based on the received bit error rate. At step 112, the new code value is determined and provided to step 116 for saving until frame 0, whereupon the new code value is provided to frame buffer 94 for determining the transmitted code value. The output of frame buffer 110 is provided to an ATM conversion circuit 108 at the output of the first CASI 90 for providing ATM data to an ATM ground communication network.

Referring to FIG. 10, there is shown timing diagrams of signals in various portions of the ECL-to-ATM protocol network gateway of the present invention. The top line represents the ATM input cells stream to the first CASI 90 shown in FIG. 9. The cell stream shows 10 cells consecutively numbered to show their flow through the system in the embodiment shown with several of these bits of the idle bit type for implementing the FEC coding arrangement of the present invention. The second line from the top represents the ECL frame stream transmitted by the satellite in the form of a header followed by plural cells each comprised of 53 bytes per the ATM standard. The ECL transmitted frame stream further includes a FEC coding stream. The ECL frame stream shown in line 2 is transmitted via the satellite link to the second CASI 130 of FIG. 9 also in the form of plural cells in a synchronous data stream. The cells in the received frame stream shown in the third line of FIG. 10 are converted to an ATM output cell stream as shown in the bottom line of FIG. 10 comprised of plural cells, including several of which are idle cells.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A communications system comprising:
    a ground-based, fixed data rate commercial communications network wherein a first data stream is transmitted in fixed length datagrams comprising cells or frames;
    a high speed, variable data rate satellite communications network, wherein a second serial data stream is transmitted in frames having an Emitter Coupled Logic (ECL) signal format, and wherein each of said frames is comprised of plural cells;
    synchronization means for monitoring and comparing timing of said first data stream and said second serial data stream and for either adding or removing non-data bearing idle cells in said first data stream for synchronizing said first data stream with said second serial data stream;
    error correction means for providing a first error correction value to said first or second data streams for correcting a first error level in data transmission;
    error detection means for monitoring said first or second data stream and determining a current error level and providing a second error correction value representing said current error level; and
    comparison means for comparing said first error correction value with said second error correction value and for providing said second error correction value to said first or second data stream if said second error correction value differs from said first error correction value.

2. The communications system of claim 1 wherein said synchronization means includes frame acquisition means for detecting the beginning of a frame.

3. The communications system of claim 2 wherein said frame acquisition means includes detection and comparison means for comparing a detected frame number with an expected frame number.

4. The communications system of claim 1 wherein said error correction is of the Reed-Solomon type.

5. The communications system of claim 1 wherein said error detection means determines a current error level with receipt of each cell.

6. The communications system of claim 5 wherein each cell is comprised of plural bits and said error detection means detects a bit error rate in said first or second data stream.

7. The communications system of claim 6 wherein said first and second error correction values provide forward error correction in said first and second data streams, respectively.

8. The communications system of claim 7 wherein bits are used for error correction, with increasing numbers of bits used to correct bit errors with increasing bit error rate values.

9. The communications system of claim 8 wherein said first error correction value is selected by a communications system user.

10. The communications system of claim 9 wherein said error detection means determines said current error level after receipt of a predetermined number of frames.

* * * * *